(12) United States Patent
Yang et al.

(10) Patent No.: US 11,777,581 B2
(45) Date of Patent: Oct. 3, 2023

(54) OPERATION METHOD IN V2X DEVICE MOUNTED ON VEHICLE

(71) Applicant: LG ELECTRONICS INC., Seoul (KR)

(72) Inventors: Yoonoh Yang, Seoul (KR); Ilnam Cho, Seoul (KR); Sangwook Lee, Seoul (KR); Jinyup Hwang, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/597,172

(22) PCT Filed: Jun. 26, 2020

(86) PCT No.: PCT/KR2020/008311
§ 371 (c)(1),
(2) Date: Dec. 28, 2021

(87) PCT Pub. No.: WO2021/002634
PCT Pub. Date: Jan. 7, 2021

(65) Prior Publication Data
US 2022/0311495 A1    Sep. 29, 2022

(30) Foreign Application Priority Data
Jul. 3, 2019 (KR) .................. 10-2019-0080199

(51) Int. Cl.
*H04B 7/06* (2006.01)
*H04W 72/04* (2023.01)
*H04W 4/40* (2018.01)

(52) U.S. Cl.
CPC ......... *H04B 7/0639* (2013.01); *H04B 7/0617* (2013.01); *H04W 4/40* (2018.02); *H04W 72/04* (2013.01)

(58) Field of Classification Search
CPC ..... H04B 7/0639; H04B 7/0617; H04W 4/40; H04W 72/04
See application file for complete search history.

(56) References Cited

U.S. PATENT DOCUMENTS 11,265,894 B2 * 3/2022 Rico Alvarino ........ H04W 8/22
11,425,543 B2 * 8/2022 Kang .................... H04W 76/14
(Continued)

FOREIGN PATENT DOCUMENTS

WO    2019029814    2/2019
WO    2019099659    5/2019

OTHER PUBLICATIONS

PCT International Application No. PCT/KR2020/008311, International Search Report dated Sep. 11, 2020, 4 pages.
(Continued)

*Primary Examiner* — Jaison Joseph
(74) *Attorney, Agent, or Firm* — LEE HONG DEGERMAN KANG WAIMEY

(57) ABSTRACT

One disclosure of the present specification provides an operation method in a vehicle-to-everything (V2X) device mounted on a vehicle. The method comprises the steps of: receiving a capability enquiry message from a base station; and transmitting capability information to the base station. The capability information includes information on whether a wireless link with the base station and a sidelink with a neighboring V2X device are supported through the same antenna. The method comprises a step of receiving, from the base station, information about a default beam set on the basis of the capability information.

12 Claims, 18 Drawing Sheets

(56) References Cited

U.S. PATENT DOCUMENTS

| | | | |
|---|---|---|---|
| 11,432,220 B2* | 8/2022 | Xu | H04W 36/08 |
| 11,445,477 B2* | 9/2022 | Hong | H04W 72/02 |
| 2016/0338094 A1* | 11/2016 | Faurie | H04W 72/23 |
| 2016/0338095 A1* | 11/2016 | Faurie | H04W 72/23 |
| 2017/0311344 A1 | 10/2017 | Lee et al. | |
| 2018/0146467 A1* | 5/2018 | Kim | H04W 72/20 |
| 2019/0052488 A1* | 2/2019 | Fujii | H04L 25/03878 |
| 2020/0053524 A1* | 2/2020 | Novlan | H04W 84/20 |
| 2020/0107170 A1* | 4/2020 | Chen | H04L 5/0053 |
| 2020/0128470 A1* | 4/2020 | Mok | H04W 24/04 |
| 2020/0229145 A1* | 7/2020 | Kang | H04W 72/23 |
| 2020/0260353 A1* | 8/2020 | Xu | H04W 72/044 |
| 2020/0314928 A1* | 10/2020 | Kang | H04W 76/14 |
| 2020/0396701 A1* | 12/2020 | Yi | H04W 72/569 |
| 2021/0045138 A1* | 2/2021 | Kang | H04W 72/569 |
| 2022/0264554 A1* | 8/2022 | Hui | H04W 72/51 |
| 2022/0311495 A1* | 9/2022 | Yang | H04B 7/0628 |

OTHER PUBLICATIONS

Huawei et al., "Beamforming for V2X sidelink for FR1 and FR2," R1-1903075, 3GPP TSG RAN WG1 Meeting #96, Mar. 2019, 6 pages.

3rd Generation Partnership Project, "Technical Specification Group Radio Access Network; Evolved Universal Terrestrial Radio Access (E-UTRA); Radio Resource Control (RRC); protocol specification (Release 15)," 3GPP TS 36.331 V15.6.0, Jun. 2019, 962 pages.

* cited by examiner

FIG. 9
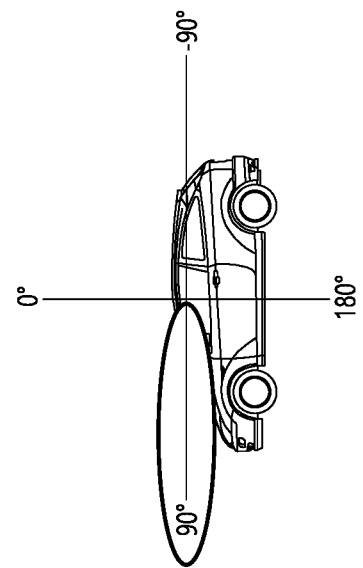
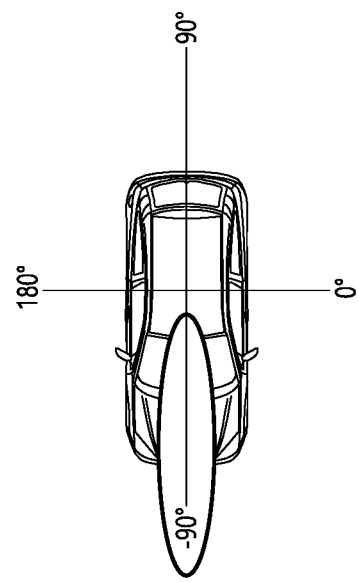

OPERATION METHOD IN V2X DEVICE MOUNTED ON VEHICLE

CROSS-REFERENCE TO RELATED APPLICATIONS

This application is the National Stage filing under 35 U.S.C. 371 of International Application No. PCT/KR2020/008311, filed on Jun. 26, 2020, which claims the benefit of earlier filing date and right of priority to Korean Application No. 10-2019-0080199, filed on Jul. 3, 2019, the contents of which is hereby incorporated by reference herein in its entirety.

TECHNICAL FIELD

The present specification relates to mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology (new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, LTE/LTE-A technology and NR technology may also be used for vehicle communication. This is called vehicle-to-everything (V2X). Communication technology through all interfaces with the vehicle is commonly called V2X.

Communication between V2X devices without going through a base station is called V2X communication, and a link used for communication between V2X devices is also called a sidelink.

3GPP Standard Release 16 discusses the implementation of NR V2X in the FR1 (410 MHz to 7.125 GHz) and FR2 (24.25 GHz to 52.6 GHz) bands. FR2 frequency band is mmWave, and beam forming is absolutely required for stable communication. However, in the current 3GPP standard release 16, beam management is not considered for the sidelink in the FR2 band. For this reason, the arrival distance of the actual vehicle-to-vehicle sidelink (SideLink) communication cannot be guaranteed, and thus stable communication becomes impossible.

SUMMARY

Therefore, the disclosure of the present specification is to propose method for solving the above-mentioned problems.

One disclosure of the present specification provides A method of operating for V2X (VEHICLE-TO-EVERYTHING) device equipped on a vehicle. The method comprises: receiving capability Enquiry message from base station; transmitting capability information to the base station; wherein the capability information includes information on whether the V2X device supports radio link with the base station and sidelink with neighbor V2X device by the same antenna, receiving, from the base station, information on default beam which is configured based on the capability information.

One disclosure of the present specification may provide a V2X (VEHICLE-TO-EVERYTHING) device equipped on a vehicle. The V2X device comprises at least one processor; and at least one memory for storing instructions and operably electrically connectable with the at least one processor, based on the instructions being operated by the at least one processor, performed operation comprising: receiving capability Enquiry message from base station; transmitting capability information to the base station; wherein the capability information includes information on whether the V2X device supports radio link with the base station and sidelink with neighbor V2X device by the same antenna, receiving, from the base station, information on default beam which is configured based on the capability information.

One disclosure of the present specification provides a non-volatile computer-readable storage medium having recorded instructions. The instructions, based on being executed by one or more processors, cause the one or more processors to: receive capability Enquiry message from base station; transmit capability information to the base station; wherein the capability information includes information on whether the V2X device supports radio link with the base station and sidelink with neighbor V2X device by the same antenna, receive, from the base station, information on default beam which is configured based on the capability information.

Therefore, the disclosure of the present specification is to propose method for solving the above-mentioned problems.

BRIEF DESCRIPTION OF THE DRAWINGS

FIG. 9 shows vertical and horizontal angles of sidelink beams.

DETAILED DESCRIPTION

Figure 1:
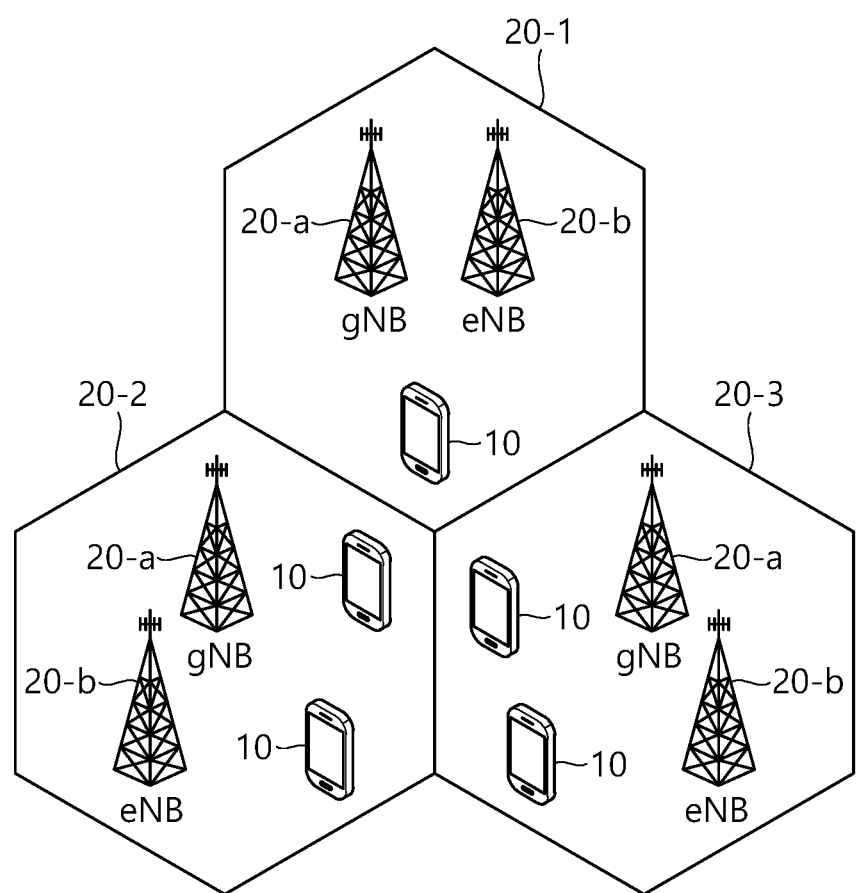
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B".

Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a device capable of wireless communication (e.g., a wireless communication device, a wireless device, or a wireless device). The operation performed by the UE may be performed by any device capable of wireless communication. A device capable of wireless communication may also be referred to as a wireless communication device, a wireless device, or a wireless device.

A base station, a term used below, generally refers to a fixed station that communicates with a wireless device, which may be called other terms such as an evolved-NodeB (eNodeB), an evolved-NodeB (eNB), a BTS (Base Transceiver System), an access point (Access Point), gNB (Next generation NodeB).

FIG. 1 is a wireless communication system.

As can be seen with reference to FIG. 1, a wireless communication system includes at least one base station (BS). The BS is divided into a gNodeB (or gNB) 20a and an eNodeB (or eNB) 20b. The gNB 20a supports 5G mobile communication. The eNB 20b supports 4G mobile communication, that is, long term evolution (LTE).

Each base station 20a and 20b provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

Hereinafter, the LTE system will be described in more detail.

Figure 2:
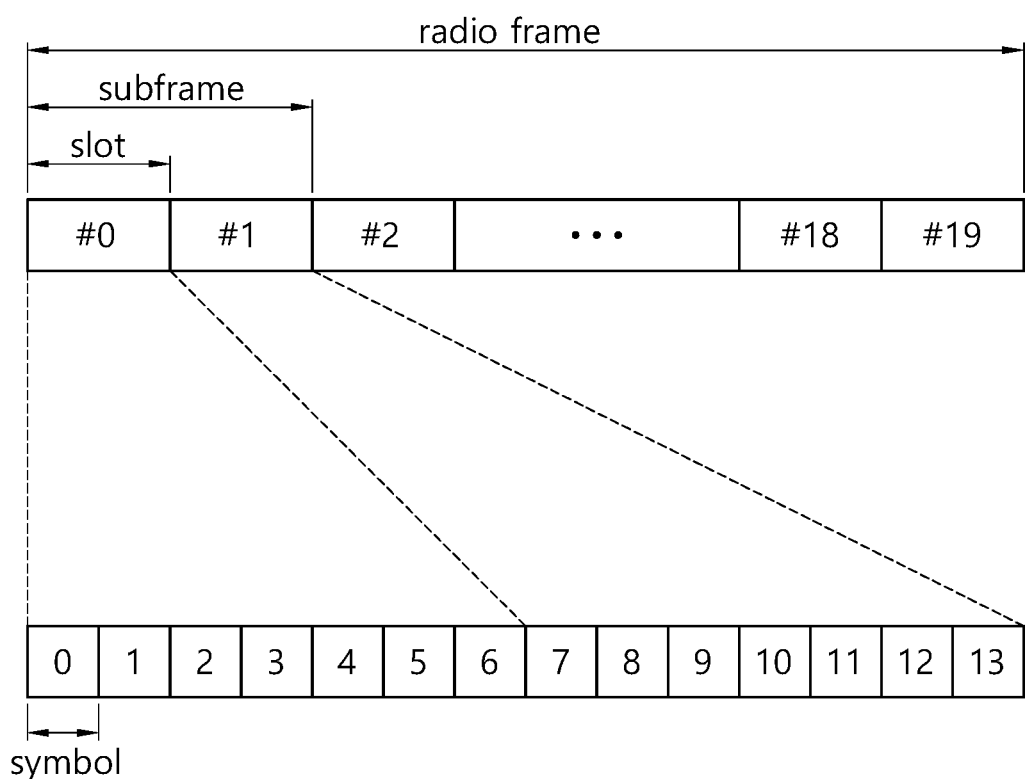
FIG. 2 shows the structure of a radio frame according to FDD in 3GPP LTE.

FIG. 2 shows the structure of a radio frame according to FDD in 3GPP LTE.

Referring to FIG. 2, a radio frame includes 10 subframes, and one subframe includes two slots. The slots in the radio frame are numbered from 0 to 19. The time it takes for one subframe to be transmitted is referred to as a transmission time interval (TTI). The TTI may be referred to as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame or the number of slots included in the subframe may be variously changed.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in a frequency domain. For example, in the LTE system, the number of resource blocks (RBs), that is, NRB may be any one of 6 to 110.

A resource block (RB) is a resource allocation unit and includes a plurality of subcarriers in one slot. For example, if one slot includes 7 OFDM symbols in the time domain and the resource block includes 12 subcarriers in the frequency domain, one resource block may include 7*12 resource elements (REs).

In 3GPP LTE, physical channels are divided into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel) and PUCCH (Physical Uplink Control Channel).

The uplink channel includes PUSCH, PUCCH, SRS (Sounding Reference Signal), and PRACH (Physical Random Access Channel).

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, eMBB (enhanced Mobile BroadBand), mMTC (massive Machine Type Communication) and URLLC (Ultra Reliable and Low Latency Communications).

URLLC relates to usage scenarios that require high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1 ms. Next, the eMBB usage scenario relates to a usage scenario requiring mobile ultra-wideband.

That is, the 5th generation mobile communication system may target higher capacity than the current 4G LTE, increase the density of mobile broadband users, and support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6

GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Operation Bands in NR>
The operating bands in NR are as follows.
The operating band of Table 3 below is an operating band converted from the operating band of LTE/LTE-A. This is called the FR1 band.

TABLE 3

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The table below shows the NR operating bands defined on the high frequency phase. This is called the FR2 band.

TABLE 4

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 3A:
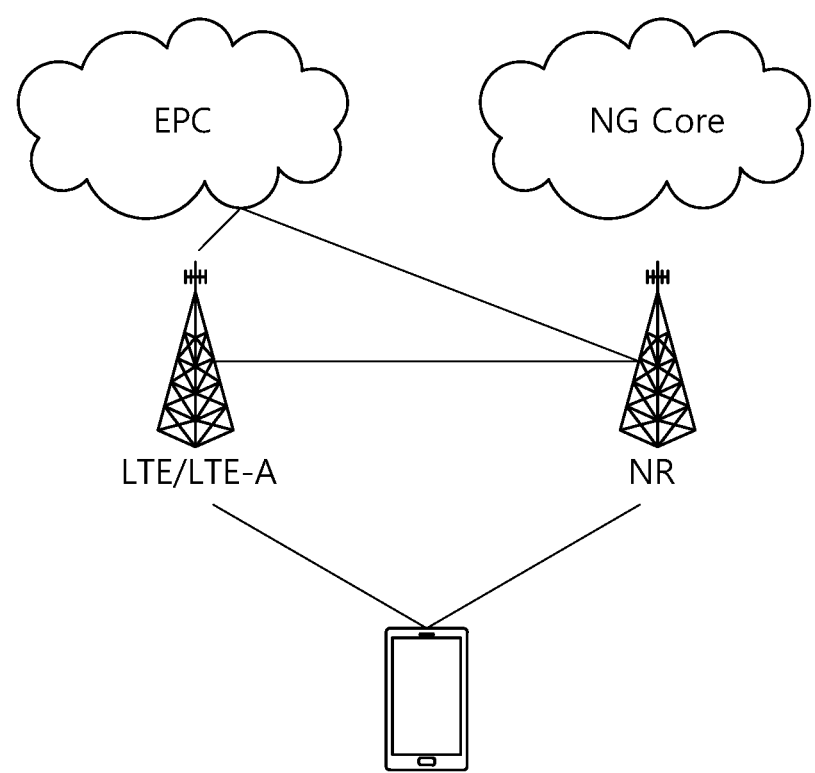
FIGS. 3a to 3c are exemplary diagrams illustrating an exemplary architecture for a service of next-generation mobile communication.
Figure 3B:
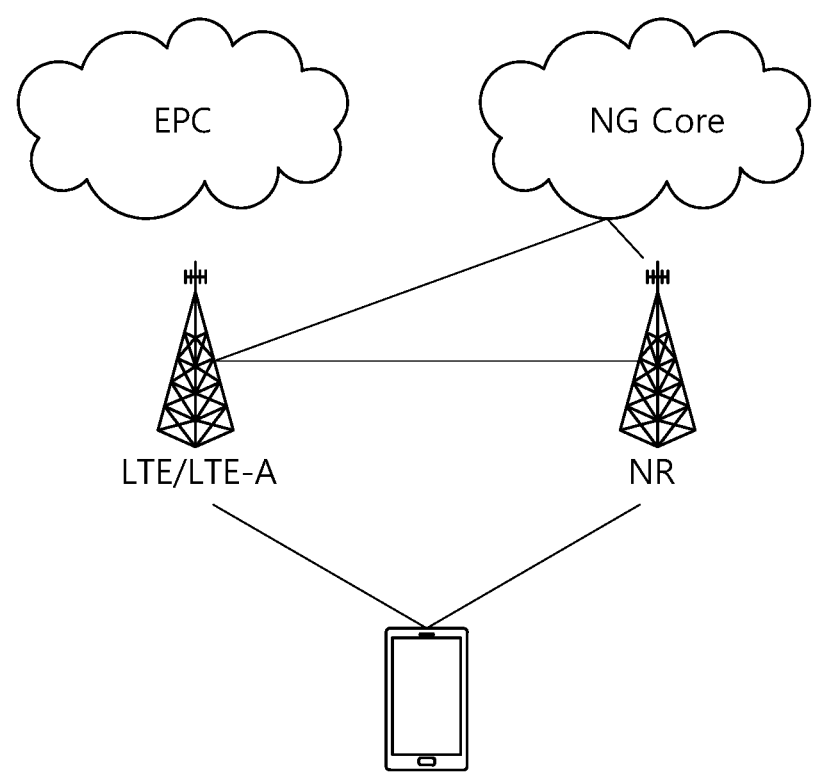
Figure 3C:
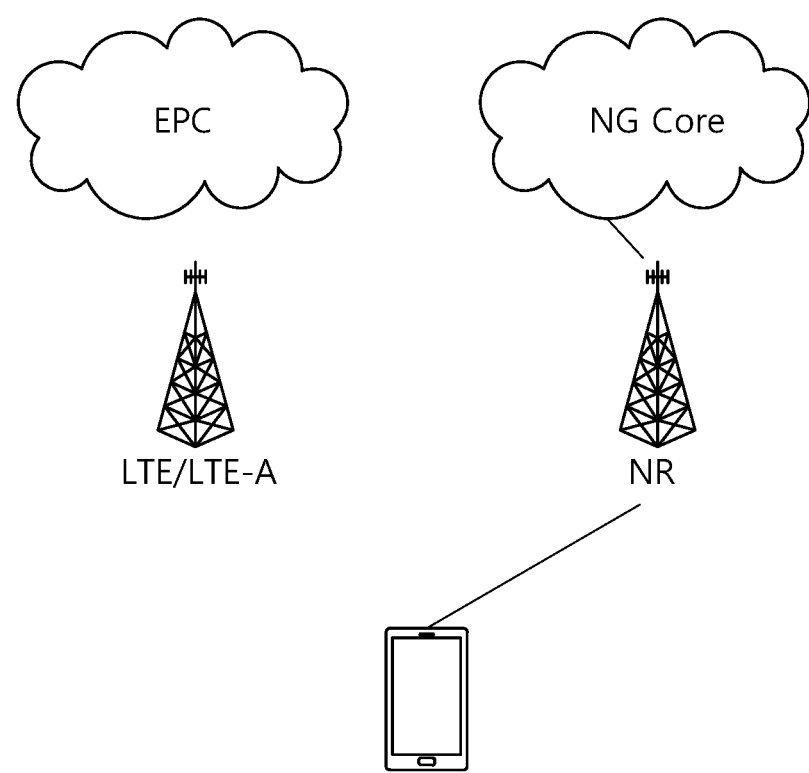

FIGS. 3a to 3c are exemplary diagrams illustrating an exemplary architecture for a service of next-generation mobile communication.

Referring to FIG. 3a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 3b, unlike FIG. 3a, an LTE/LTE-A-based cell is connected to a core network for 5G mobile communication, that is, the LTE/LTE-A-based cell is connected to a Next Generation (NG) core network.

A service method based on the architecture shown in FIG. 3a and FIG. 3b is referred to as NSA (non-standalone).

Referring to FIG. 3c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 4:
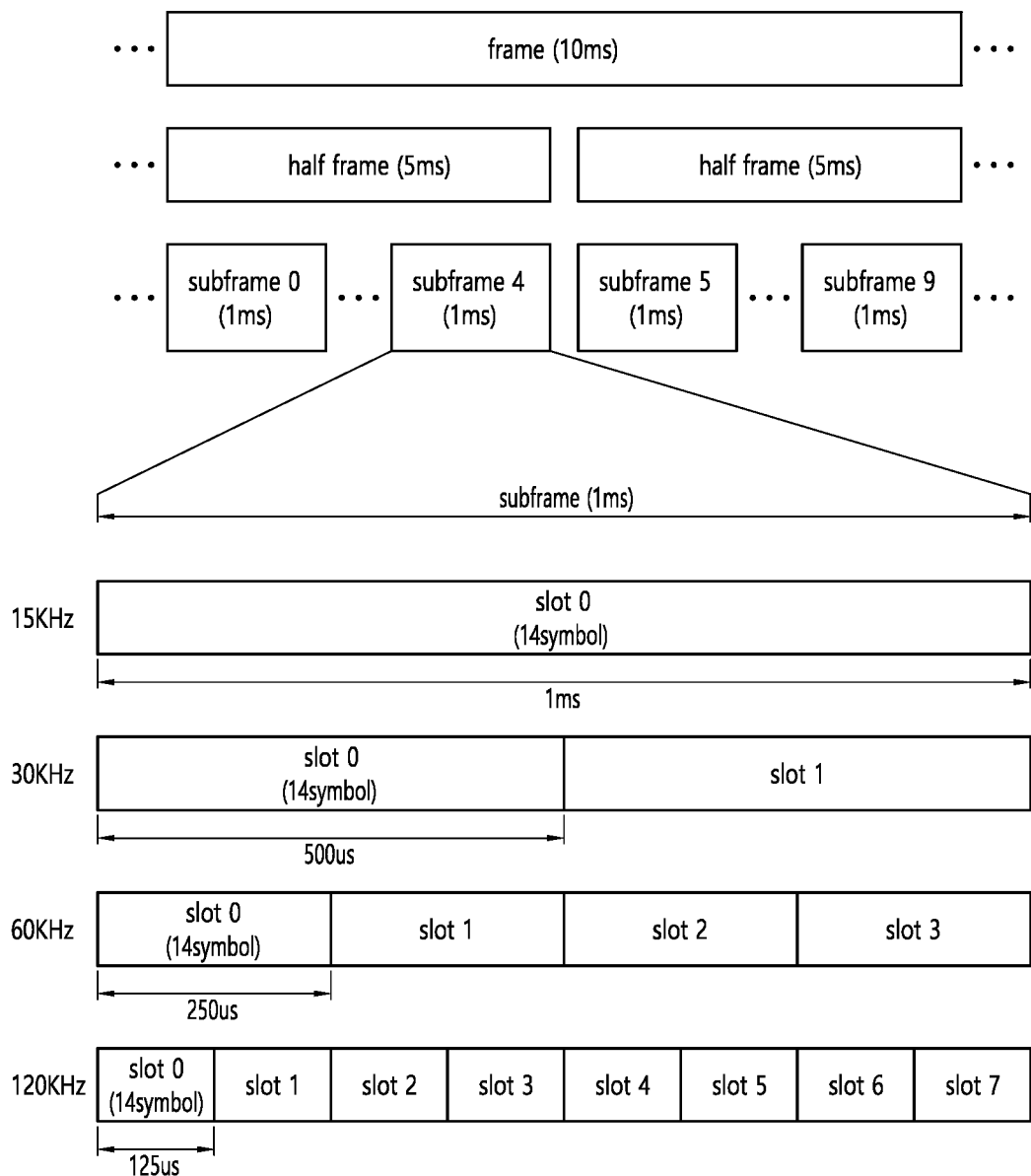
FIG. 4 illustrates structure of a radio frame used in NR.

FIG. 4 illustrates structure of a radio frame used in NR.

In NR, uplink and downlink transmission consists of frames. A radio frame has a length of 10 ms and is defined as two 5 ms half-frames (Half-Frame, HF). A half-frame is defined as 5 1 ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

Figure 5:
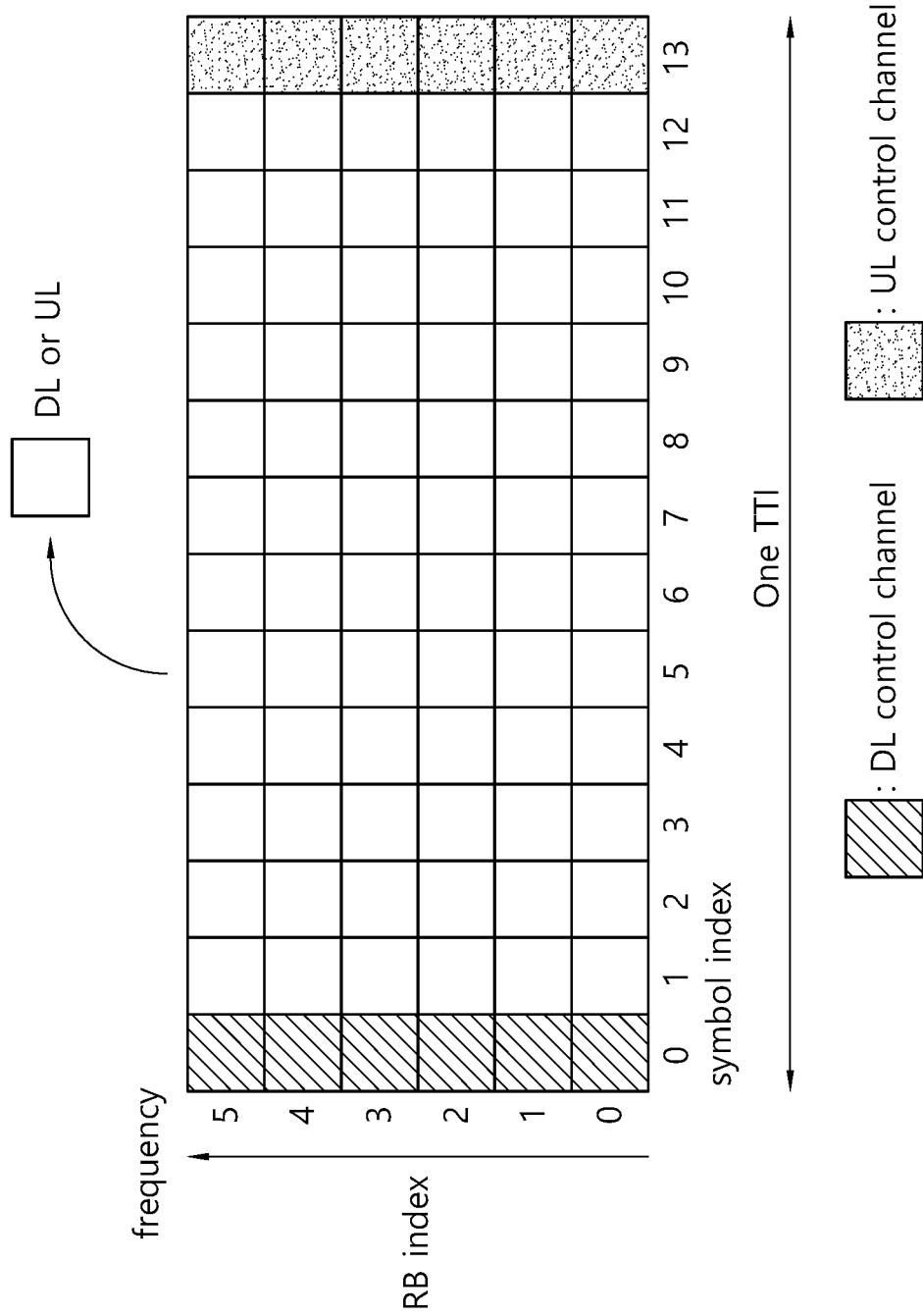
FIG. 5 shows an example of subframe types in NR.

FIG. 5 shows an example of subframe types in NR.

The TTI (transmission time interval) shown in FIG. 5 may be referred to as a subframe or a slot for NR (or new RAT). The subframe (or slot) of FIG. 5 may be used in a TDD system of NR (or new RAT) to minimize data transmission delay. As shown in FIG. 5, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 5

| M | Δf = 2$^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OLDM symbols per slot Nslotsymb, the number of slots per frame Nframe,μslot, and the number of slots per subframe Nsubframe,μslot are expressed as shown in the following table.

TABLE 6

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OLDM symbols per slot Nslotsymb, the number of slots per frame Nframe,μslot, and the number of slots per subframe Nsubframe,μslot are expressed as shown in the following table.

TABLE 7

| M | $N_{symb}^{slot}$ | $N_{slot}^{frame,μ}$ | $N_{slot}^{subframe,μ}$ |
|---|---|---|---|
| 2 | 12 | 40 | 4 |

<V2X (Vehicle-to-Everything)>

V2X (vehicle-to-everything) refers to communication technology through all interfaces with the vehicle. The implementation form of V2X may be as follows.

In V2X, 'X' may mean a person (Persian) or a pedestrian (PEDESTRIAN). In this case, V2X may be displayed as V2P (vehicle-to-person or vehicle-to-pedestrian). Here, the pedestrian is not necessarily limited to a person moving on foot, and may include a person riding a bicycle, a driver or a passenger of a vehicle (below a certain speed).

Alternatively, 'X' may be an infrastructure/network. In this case, V2X may be expressed as V2I (vehicle-to-infrastructure) or V2N (vehicle-to-network), and may mean communication between a vehicle and a roadside unit (ROADSIDE UNIT: RSU) or a vehicle and a network. The roadside device may be a device that informs traffic-related infrastructure, for example, a speed. The roadside device may be implemented in a base station or a fixed terminal.

Alternatively, 'X' in V2X may be a vehicle (VEHICLE). In this case, V2X may be expressed as V2V (vehicle-to-vehicle), and may mean communication between vehicles.

A wireless device mounted on a vehicle may be referred to as a V2V device or a V2X device.

Communication between V2X devices without going through a base station is called V2X communication, and a link used for communication between V2X devices is also called sidelink.

There are the followings as physical signals used in sidelink.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, there are the following physical signals used in sidelink.

Demodulation Reference signal (DMRS)
Sidelink Synchronization signal (SLSS)

The SLSS includes a primary sidelink synchronization signal (PSLSS) and a secondary sidelink synchronization signal (Secondary SLSS: SSLSS).

Figure 6:
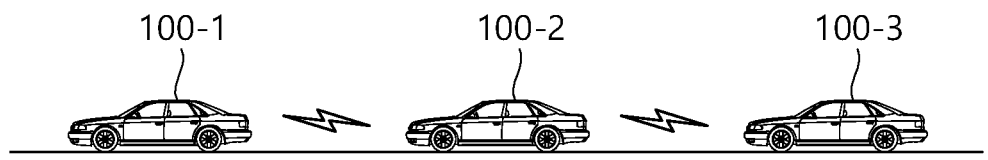
FIG. 6 is an exemplary diagram illustrating the concept of V2X.

FIG. 6 is an exemplary diagram illustrating the concept of V2X.

As can be seen with reference to FIG. 6, the wireless devices (ie, V2X devices) (100-1, 100-2, 100-3) mounted on the vehicle may communicate with each other.

<Problems to be Solved by the Disclosure of this Specification>

3GPP Standard Release 16 discusses the implementation of NR V2X in the FR1 (410 MHz to 7.125 GHz) and FR2 (24.25 GHz to 52.6 GHz) bands. As FR2 frequency band is mmWave, beam forming is absolutely required for stable communication. However, in the current 3GPP standard Release 16, beam management is not considered for the sidelink in the FR2 band. For this reason, the actual vehicle-to-vehicle sidelink (SideLink) communication reach distance cannot be guaranteed, and thus stable communication becomes impossible.

<Disclosures of the Present Specification>

Accordingly, the disclosure of the present specification suggests methods for solving the above-described problems. Specifically, the disclosure of the present specification proposes a sidelink beamforming operation method for NR V2X communication in the FR2 band (mmWave).

Based on the current FR2 28 GHz band Uu link (interface between the base station and the terminal) related transmit power (eg, minimum peak effective isotropic radiated power (EIRP), spherical coverage EIRP) and reception sensitivity (reference sensitivity, REF SENS), the sidelink budget (SideLink) Budget) (ie, communication arrival distance) may be known through path loss (PL) analysis.

Figure 7:
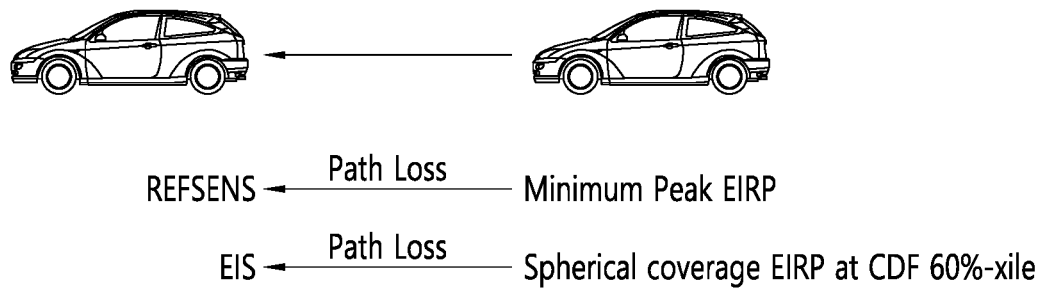
FIG. 7 is an exemplary diagram illustrating a pair of transmit power and receive sensitivity.

FIG. 7 is an exemplary diagram illustrating a pair of transmit power and receive sensitivity.

Referring to FIG. 7, a pair of transmit power and receive sensitivity used in Equations 1 and 2 for path loss (PL) is shown. EIS stands for Effective Isotropic Sensitivity.

$$PL(dBm) = \text{minimum peak EIRP} - \text{REFSENS} \quad \text{[Equation 1]}$$

$$PL(dBm) = \text{spherical coverage EIRP at CDF } 60\%\_\text{tile} - \text{EIS} \quad \text{[Equation 2]}$$

The vehicle-to-vehicle sidelink communication coverage distance (d (meter)) can be obtained by applying the PL calculated above to a free space path loss (FSPL) model.

$$FSPL(dBm) = 20*\log 10(d\_meter) + 20*\log 10(fc\_GHz) + 32.45$$

$$FSPS = PL$$

$$d(meter) = power(10, (PL - 20*\log 10(fc\_GHz) - 92.45)/20)$$ [Equation 3]

The frequency bands of V2X devices (eg, terminals using Power Class2) operating in the FR2 band and the minimum peak EIRP, spherical coverage EIRP, REFSENSE, and EIS of each frequency band are summarized as follows.

TABLE 8

| Power class | Terminal type |
| --- | --- |
| 1 | Fixed wireless access (FWA) UE |
| 2 | Vehicular UE |
| 3 | Handheld UE |
| 4 | High power non-handheld UE |

The table below shows the minimum peak EIRP for power class 2.

TABLE 9

| Operating band | Min peak EIRP (dBm) |
| --- | --- |
| n257 | 29 |
| n258 | 29 |
| n261 | 29 |

Minimum peak EIRP is defined as a lower limit with no tolerance.

The table below shows the spherical coverage for power class 2.

TABLE 10

| Operating band | minimum EIRP at 60%-tile CDF (dBm) |
| --- | --- |
| n257 | 18.0 |
| n258 | 18.0 |
| n261 | 18.0 |

In a 60%-tile cumulative distribution function (CDF), the Minimum EIRP is defined as a lower limit with no tolerance.

Using the above values, the communication distance between vehicles is analyzed according to the presence or absence of beam forming and beam management as follows.

I. When Using Beamforming and Beam Management for NR V2X Sidelink in FR2 Band

In this case, the sidelink communication reach distance may be analyzed differently depending on whether the used antenna is dedicated to the sidelink or shared with the Uu link (the link between the base station and the V2X device).

In the case of a sidelink-only antenna, since a beam can be optimally formed in the direction of the transmit/receive beam through the sidelink, the above PL Equation 1 can be applied.

In this case, as shown in Table 11 below, it can be seen that transmission/reception is possible up to about 956 meters based on a channel bandwidth of 50 MHz and about 340 meters based on a channel bandwidth of 400 MHz. However, in the actual FR2 licensed band, it is expected that there will be few cases in which sidelink-only service is provided without Uu link NR service. Therefore, a model supporting both Uu link and side link should be considered.

When both the sidelink and the Uu link are supported by the common antenna, since the sidelink must be supported in a situation that satisfies the spherical coverage EIRP of the Uu link standard, PL Equation 2, that is, using spherical coverage EIRP and EIS, is used. PL can be applied. In this case, as shown in below Table 11, it can be seen that transmission/reception is possible up to about 76 meters based on a channel bandwidth of 50 MHz and about 27 meters based on a channel bandwidth of 400 MHz. It is judged that this is close to the actual model.

TABLE 11

| | | Using Beamforming and Beam Management | | | | | | | | |
| --- | --- | --- | --- | --- | --- | --- | --- | --- | --- | --- |
| | Min. PeakEIRP (dBm) | REFSENS (dbm/CBW) | | | | EIRP@60% (dBM) | EIS@60% (dBm/CBW) | | | |
| | | 50 MHz | 100 MHz | 200 MHz | 400 MHz | | 50 MHz | 100 MHz | 200 MHz | 400 MHz |
| PL Distance (m) | 29 | −92 121 956 | −89 118 677 | −86 115 479 | −83 112 339 | 18 | −81 99 76 | −78 96 54 | −75 93 38 | −75 90 27 |

II. When Beamforming is Used for NR V2X Sidelink in FR2 Band, but Beam Management is not Used In this case, it cannot be guaranteed to properly form the sidelink in the direction of the transmit/receive beam.

Figure 8:
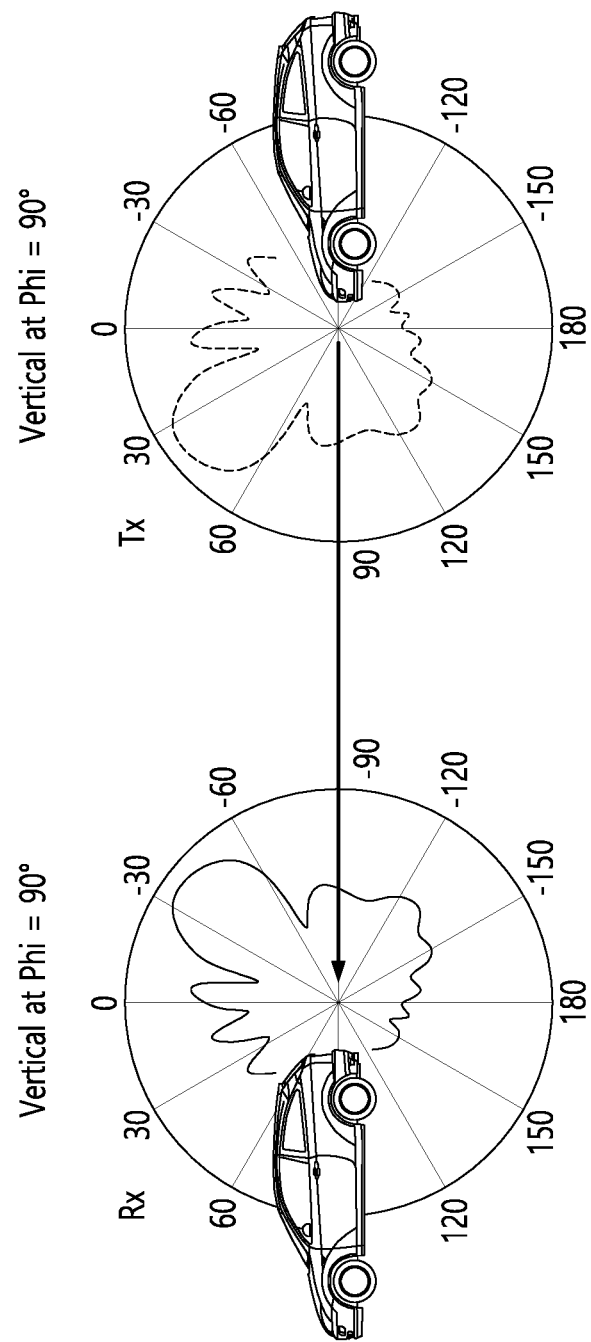
FIG. 8 shows an example of a situation in which beamforming is used for NR V2X sidelink in the FR2 band, but beam management is not used.

FIG. 8 shows an example of a situation in which beamforming is used for NR V2X sidelink in the FR2 band, but beam management is not used, and FIG. 9 shows vertical and horizontal angles of sidelink beams.

As shown in FIG. 8, when both the sidelink and the Uu link are supported by the common antenna, as an operation without beam management, the FR2 NR V2X operation is applied to the Uu link when switching from the Uu link to the sidelink. There may be a case where sidelink communication is performed while maintaining the beam as it is. In this case, the beam formed on the sidelink corresponds to the SideLobe, the beam gain becomes low, the EIRP actually applied becomes small, and the REFSENS and EIS become large, so that the PL decreases. As a result, the arrival distance(d) of the sidelink communication is reduced, and the quality of the sidelink communication is not guaranteed.

The main beam is formed at about −40 degrees for the left receiving vehicle and about 40 degrees for the right transmitting vehicle, and in this state, −90 degrees (receiving vehicle) and 90 degrees (transmitting vehicle) corresponding to the side link The PL of the direction can be calculated as shown in Table 2 from the following equation.

PL(dBm)=EIRP_at_Sidelink−REFSENS_at_Sidelink     [Equation 4]

From here,

EIRP_at_Sidelink=minimum{EIRP_at_Vertical_90 degrees&Horizontal_−90 degrees,Spherical coverage EIRP at CDF 60%}

REFSENS_at_Sidelink=maximum{RESENSE_at_Vertical_90eh&Horizontal_90 degrees,EIS}

The assumed vertical and horizontal angles are shown in FIG. 9.

The table below shows the sidelink reach when beamforming is used but beam management is not used.

TABLE 12

In case beamforming is used but beam management is not used (w/BF & w/o BM)

| EIRP_at_Sidelink (dBm) | REFSENS_at_Sidelink (dBm/CBW) | | | |
|---|---|---|---|---|
| | 50 MHz | 100 MHz | 200 MHz | 400 MHz |
| 6.6 | −72.5 | −69.5 | −66.5 | −63.5 |
| PL | 79.1 | 76.1 | 73.1 | 70.1 |
| Distance(m) | 8 | 5 | 4 | 3 |

Sidelink communication reach distance calculated from PL is very short, about 8 meters based on 50 MHz reception channel bandwidth and 3 meters based on 400 MHz. And even if it is possible, the distance must be too limited.

In order to solve this problem, in a situation where both the sidelink and the Uu link are supported by the common antenna, if beam management cannot be used, when switching from the Uu link to the sidelink in the FR2 band, the Uu link There may be a method of forming a beam by default as a sidelink to a level that satisfies the old coverage EIRP. This method can ensure that EIRP and REFSENS are at the Uu link level to form a main lobe in the sidelink direction as much as possible.

Figure 10:
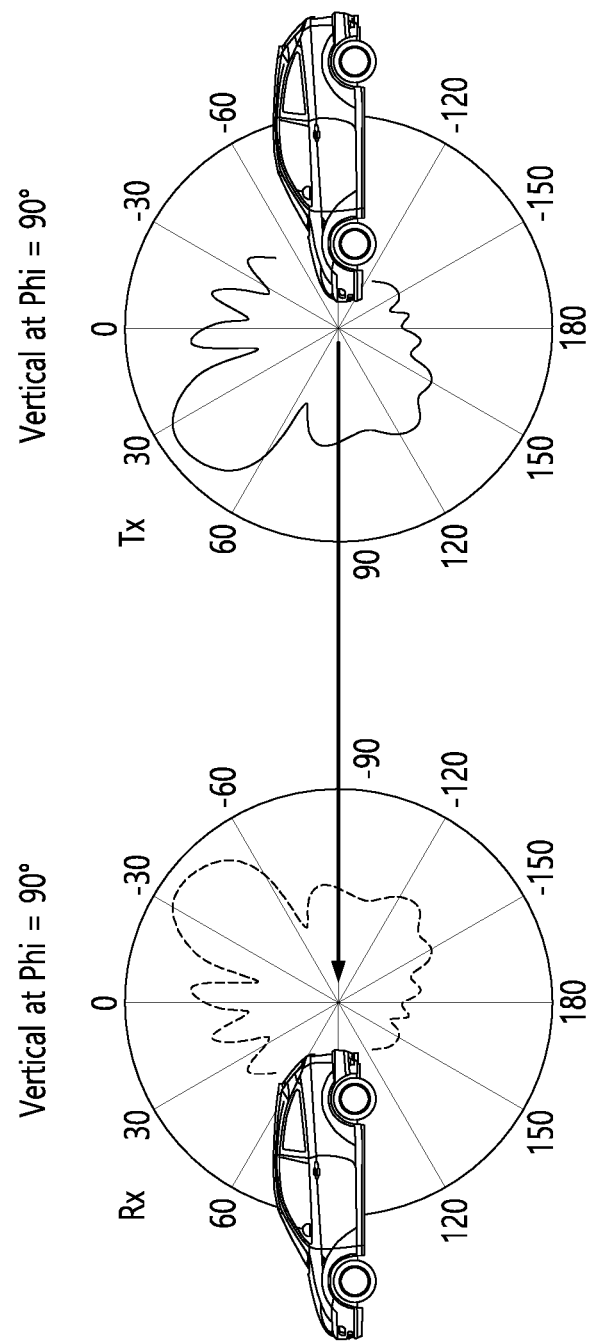
FIG. 10 shows REFSENS of the receiving vehicle at a beam angle of −90 degrees, and EIRP of the transmitting vehicle at a beam angle of 90 degrees.

FIG. 10 shows REFSENS of the receiving vehicle at a beam angle of −90 degrees, and EIRP of the transmitting vehicle at a beam angle of 90 degrees.

FIG. 10 shows path loss PL in the −90 degree (receiving vehicle) and 90 degree (transmitting vehicle) directions corresponding to the sidelink in a situation where beamforming is used but beam management is not used.

The path loss PL can be obtained as shown in Table 13 below.

The table below shows the sidelink arrival distance in a situation where beamforming is used but beam management is not used when forming a default beam in the sidelink direction.

TABLE 13

In case beamforming is used but beam management is not used (w/BF & w/o BM)

| EIRP_at_Sidelink (dBm) | REFSENS_at_Sidelink (dBm/CBW) | | | |
|---|---|---|---|---|
| | 50 MHz | 100 MHz | 200 MHz | 400 MHz |
| 17.2 | −81 | −78 | −75 | −72 |
| PL | 98.2 | 95.2 | 92.2 | 89.2 |
| Distance(m) | 69 | 49 | 35 | 25 |

The sidelink communication reach distance calculated from the PL is about 69 meters based on the reception channel bandwidth of 50 MHz and about 25 meters based on 400 MHz.

In summary, for this reason, a V2X device supporting FR2 NR supports both the Uu link and the sidelink with a common antenna, supports beam management for the Uu link, and supports beam management for the sidelink. If not supported, when switching from the Uu link to the sidelink, we propose a method of forming a beam with the sidelink as a basic beam to a level that satisfies the Uu link spherical coverage EIRP. Due to the characteristics of the FR2 beam, simultaneous transmission or reception of the Uu link and the sidelink at the same time is not supported, that is, it is suggested that the Uu link and the sidelink of the V2X device support the TDM (Time Division Mutiplexing) method.

To this end, it is proposed that the base station (gNB or eNodeB) provides information on the sidelink schedule and default beam angle to the terminal.

In addition, the vehicle terminal needs to transmit capability information on whether or not the terminal supports both the Uu link and the side link to the base station. This will be described with reference to FIG. 11.

Figure 11:
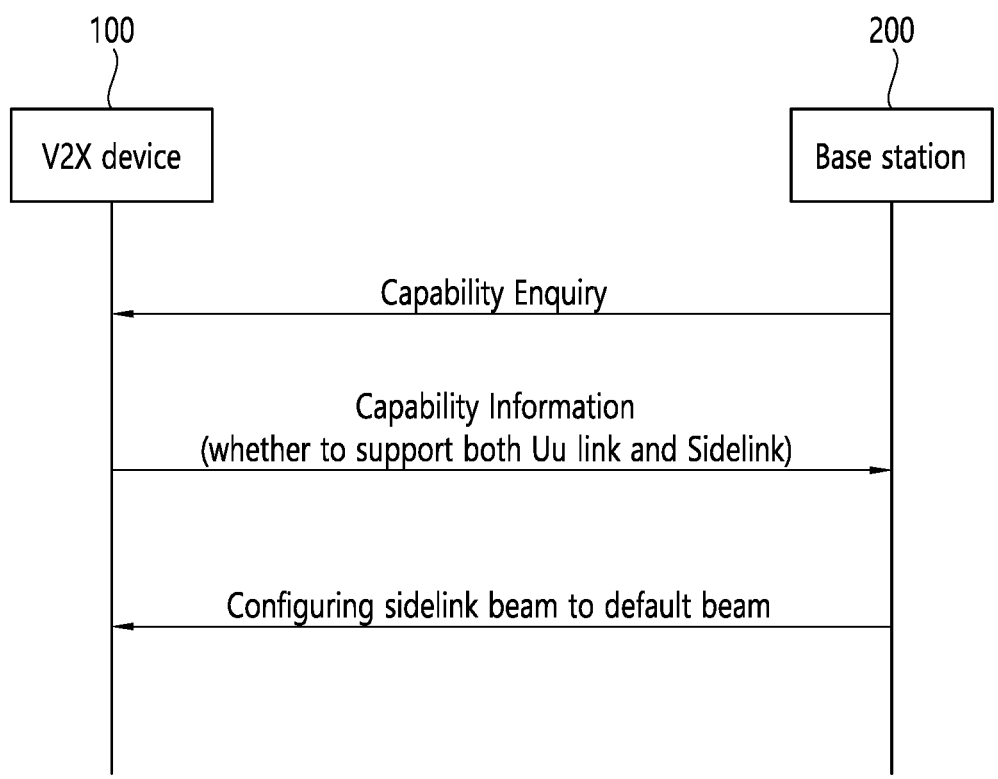
FIG. 11 shows an example of setting a sidelink beam as a default beam based on capability information.

FIG. 11 shows an example of setting a sidelink beam as a default beam based on capability information.

First, the base station 200 transmits a capability inquiry message. Then, the V2X device 100 transmits the capability information to the base station 200. The capability information may include information indicating that the V2X device supports both the Uu link and the sidelink.

Then, the base station 200 may deliver information to the V2X device 100 to set the sidelink schedule and the corresponding sidelink beam as a 'default beam'.

Here, that the V2X device supports both the Uu link and the sidelink means that it supports communication with the base station and V2X communication using the same antenna.

That is, when the V2X device supports both the Uu link and the sidelink, it means that both communication with the base station and V2X communication are performed through the first RF chain (including the antenna) in the same frequency band (band).

In this case, information indicating whether the V2X device supports both the Uu link and the sidelink may be included in the capability information for each band.

Or in a different frequency band (band), communication with the base station uses the first RF chain (without antenna), and V2X communication uses the second RF chain (without antenna), but even when the same antenna is shared, the same It may be included in supporting communication with a base station and V2X communication using an antenna.

In this case, information indicating whether the V2X device supports both the Uu link and the side link may be included in the capability information for each RF implementation.

And, not supporting both the Uu link and the sidelink means that only one of the communication with the base station or the V2X communication is supported using the same antenna. That is, it refers to a terminal that supports only one of communication with a base station or V2X communication using the first RF chain (including antenna) in the same frequency band (band).

The default beam may be defined at a level that satisfies the Uu link spherical coverage EIRP, as shown in FIGS. 9 and 10.

For example, if the Uu link spherical coverage includes 90 degrees (or −90 degrees) with respect to the vertical axis, it is suggested as a beam of 90 degrees or −90 degrees with respect to the vertical axis to the front or rear of the vehicle.

As another example, if the Uu link spherical coverage is less than 90 degrees (or −90 degrees) with respect to the vertical axis, a beam that is maximally closest to the 90 degrees or −90 degrees beam with respect to the vertical axis to the front or rear of the vehicle is suggested.

III. Summary of the Disclosures Herein

One disclosure of the present specification provides A method of operating for V2X (VEHICLE-TO-EVERYTHING) device equipped on a vehicle. The method comprises: receiving capability Enquiry message from base station; transmitting capability information to the base station; wherein the capability information includes information on whether the V2X device supports radio link with the base station and sidelink with neighbor V2X device by the same antenna, receiving, from the base station, information on default beam which is configured based on the capability information.

The information on default beam includes information configuring a beam for sidelink as default beam.

The information on default beam includes information for a beam for sidelink.

The default beam is determined by a level that satisfies a spherical coverage EIRP (effective isotropic radiated power) for a radio link with the base station.

The default beam is set to a beam of 90 degrees or −90 degrees with respect to the vertical axis to the front or rear Way, based on that the spherical coverage for the radio link with the base station includes 90 degrees or −90 degrees with respect to the vertical axis of the vehicle.

The sidelink is operated in FR2 band.

Beamforming is used for the sidelink, but beam management for the sidelink is not used.

One disclosure of the present specification may provide a V2X (VEHICLE-TO-EVERYTHING) device equipped on a vehicle. The V2X device comprises at least one processor; and at least one memory for storing instructions and operably electrically connectable with the at least one processor, based on the instructions being operated by the at least one processor, performed operation comprising: receiving capability Enquiry message from base station; transmitting capability information to the base station; wherein the capability information includes information on whether the V2X device supports radio link with the base station and sidelink with neighbor V2X device by the same antenna, receiving, from the base station, information on default beam which is configured based on the capability information.

One disclosure of the present specification provides a non-volatile computer-readable storage medium having recorded instructions. The instructions, based on being executed by one or more processors, cause the one or more processors to: receive capability Enquiry message from base station; transmit capability information to the base station; wherein the capability information includes information on whether the V2X device supports radio link with the base station and sidelink with neighbor V2X device by the same antenna, receive, from the base station, information on default beam which is configured based on the capability information.

IV. Devices in General to which the Disclosure of the Present Specification May be Applied The disclosures of the present specification described so far may be implemented through various means. For example, the disclosures of the present specification may be implemented by hardware, firmware, software, or a combination thereof. Specifically, it will be described with reference to the drawings.

Figure 12:
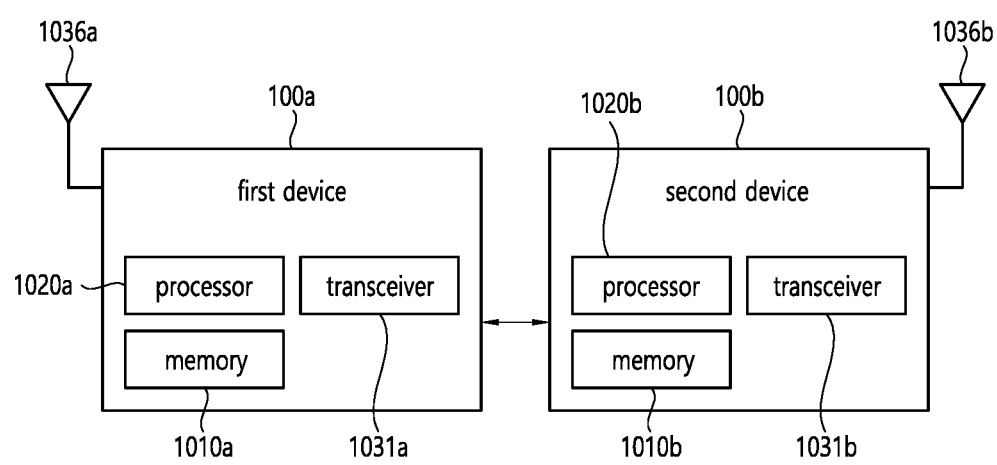
FIG. 12 shows an apparatus according to an embodiment.

FIG. 12 shows an apparatus according to an embodiment.

Referring to FIG. 12, a wireless communication system may include a first device (100a) and a second device (100b).

The first device (100a) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100b) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The first device (100a) includes at least one processor, such as a processor (1020a), and at least one memory, such as a memory (1010a), it may include at least one transceiver, such as transceiver (1031a). The processor (1020a) may perform the functions, procedures, and/or methods described above. The processor (1020a) may perform one or more protocols. For example, the processor (1020a) may perform one or more layers of an air interface protocol. The memory (1010a) is connected to the processor (1020a) and may store various types of information and/or commands. The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b)

may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 13:
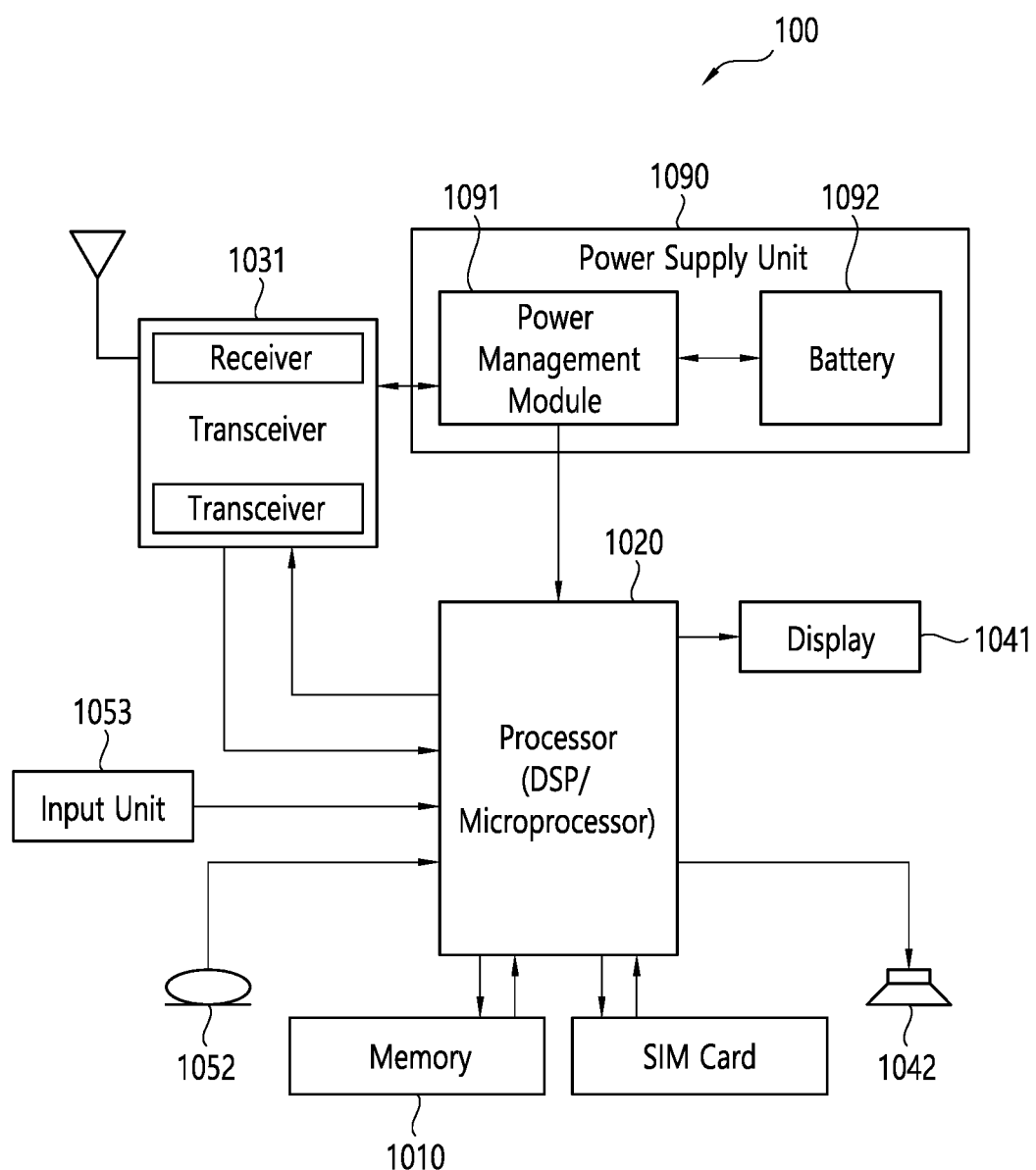
FIG. 13 is a block diagram illustrating the configuration of a terminal according to an embodiment.

FIG. 13 is a block diagram illustrating the configuration of a terminal according to an embodiment.

In particular, FIG. 13 is a diagram illustrating the apparatus of FIG. 12 in more detail above.

The device includes a memory (1010), a processor (1020), a transceiver (1031), a power management module (1091), a battery (1092), a display (1041), an input unit (1053), a speaker (1042) and a microphone (1052), SIM (subscriber identification module) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 14:
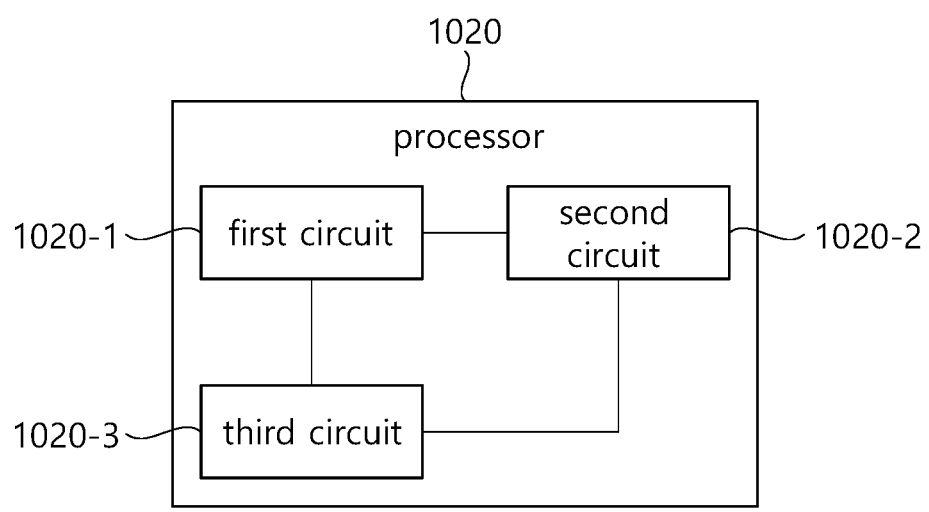
FIG. 14 shows a block diagram of a processor in which the disclosure of the present specification is implemented.

FIG. 14 shows a block diagram of a processor in which the disclosure of the present specification is implemented.

As can be seen with reference to FIG. 14, in order that the proposed functions, procedures and/or methods described in the disclosure of this specification is implemented, a processor (1020) may include a plurality of circuitry. For example, the processor (1020) may include a first circuit (1020-1), a second circuit (1020-2), and a third circuit (1020-3). Also, although not shown, the processor (1020) may include more circuits. Each circuit may include a plurality of transistors.

The processor (1020) may be referred to as an ASIC (application-specific integrated circuit) or an AP (application processor), and may include at least one of a DSP (digital signal processor), a CPU (central processing unit), and a GPU (graphics processing unit).

The first circuit (1020-1) may receive a capability inquiry message from the base station.

The second circuit (1020-2) may transmit capability information to the base station. The capability information may include information on whether to support a radio link with the base station and a sidelink with a neighboring V2X device through the same antenna.

The third circuit (1020-3) may receive information on a default beam configured based on the capability information from the base station.

The information on the default beam may include: information in which a beam for sidelink is set as a default beam.

The information on the default beam may include: information for a beam for sidelink.

The default beam may be set to a level that satisfies: spherical coverage EIRP (effective isotropic radiated power) for a radio link with the base station.

If the spherical coverage for the radio link with the base station includes 90 degrees or −90 degrees with respect to the vertical axis of the vehicle, the default beam is set to 90 degrees or −90 degrees with respect to the vertical axis forward or backward. can The sidelink may be operated in the FR2 band.

Beam forming may be used for the sidelink, but beam management may not be used.

Figure 15:
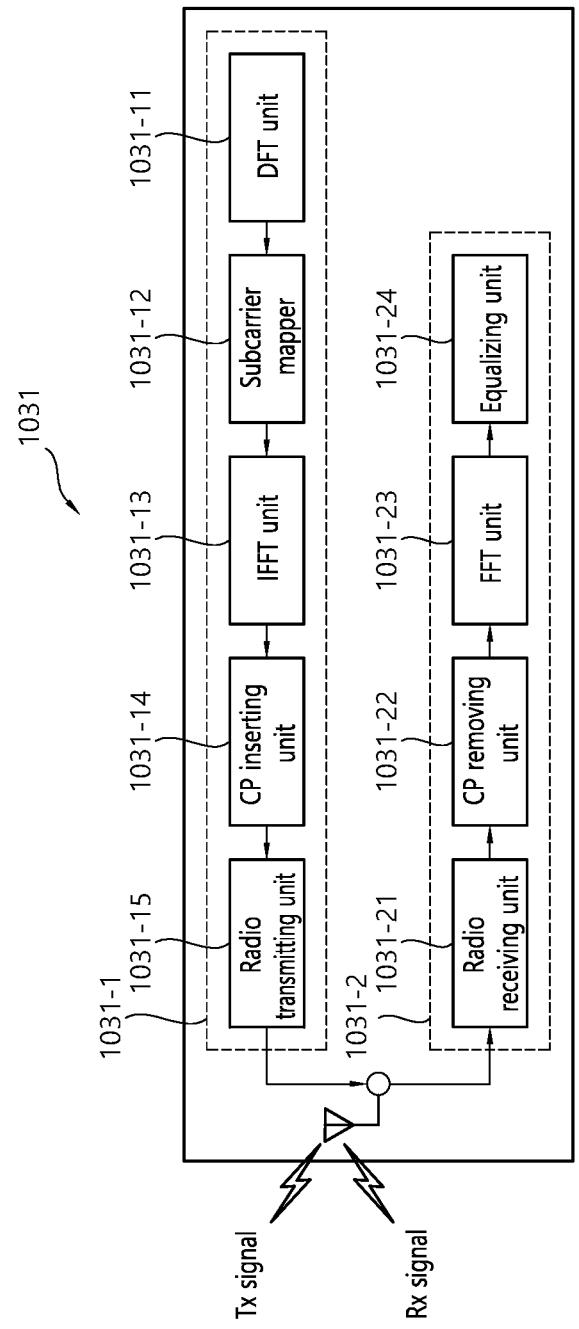
FIG. 15 is a detailed block diagram illustrating the transceiver of the first device shown in FIG. 12 or the transceiver of the device shown in FIG. 13 in detail.

FIG. 15 is a detailed block diagram illustrating the transceiver of the first device shown in FIG. 12 or the transceiver of the device shown in FIG. 13 in detail.

Referring to FIG. 15, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT (Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Inter-symbol interference) and ICI (Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1), It performs the reverse function of the CP insertion unit (1031-14) and the IFF unit (1031-13). The receiver (1031-2) may further include a demodulator.

V. Examples to which the Disclosure of the Present Specification can be Applied

Although not limited thereto, the various descriptions, functions, procedures, suggestions, methods, and/or flow charts of the disclosure of the present specification disclosed may be applied in various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 16:
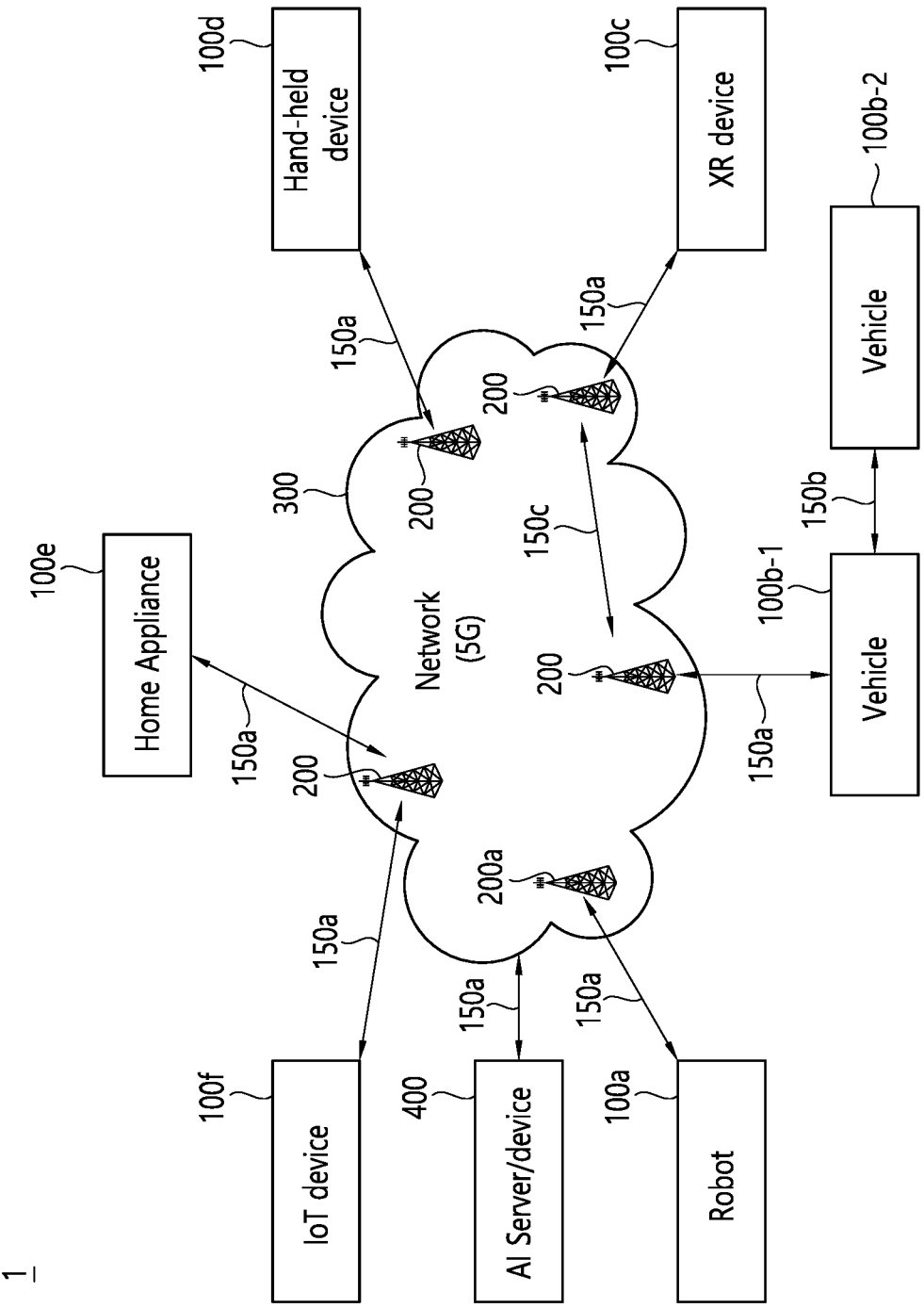
FIG. 16 illustrates a communication system 1 applied to the disclosure of the present specification.

FIG. 16 illustrates a communication system 1 applied to the disclosure of the present specification.

Referring to FIG. 16, a communication system (1) applied to the disclosure of the present specification includes a wireless device, a base station, and a network. Here, the wireless device may mean a device that performs communication using a wireless access technology (e.g., 5G NR (New RAT), LTE (Long Term Evolution)), and may be referred to as a communication/wireless/5G device. Although not limited thereto, the wireless device may include a robot (100*a*), a vehicle (100*b*-1, 100*b*-2), an XR (eXtended Reality) device (100*c*), a hand-held device (100*d*, and a home appliance (100*e*), an IoT (Internet of Thing) device (100*f*), and an AI device/server (400). For example, the vehicle may include a vehicle equipped with a wireless communication function, an autonomous driving vehicle, a vehicle capable of performing inter-vehicle communication, and the like. Here, the vehicle may include an UAV (Unmanned Aerial Vehicle) (e.g., a drone). XR devices include AR (Augmented Reality)/VR (Virtual Reality)/MR (Mixed Reality) devices, and include a HMD (Head-Mounted Device), a HUD (Head-Up Display) provided in a vehicle, a television, a smartphone, It may be implemented in the form of a computer, a wearable device, a home appliance, a digital signage, a vehicle, a robot, and the like. The portable device may include a smart phone, a smart pad, a wearable device (eg, a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200*a*) may operate as a base station/network node to other wireless devices.

The wireless devices (100*a*-100*f*) may be connected to the network (300) through the base station (200). AI (Artificial Intelligence) technology may be applied to the wireless devices (100*a*-100*f*), and the wireless devices (100*a*-100*f*) may be connected to the AI server (400) through the network (300). The network (300) may be configured using a 3G network, a 4G (e.g., LTE) network, or a 5G (e.g., NR) network. The wireless devices (100*a*-100*f*) may communicate with each other through the base station (200)/network (300), but may also communicate directly (e.g. sidelink communication) without passing through the base station/network. For example, the vehicles (100*b*-1, 100*b*-2) may perform direct communication (e.g. Vehicle to Vehicle (V2V)/Vehicle to everything (V2X) communication). In addition, the IoT device (e.g., sensor) may directly communicate with other IoT devices (e.g., sensor) or other wireless devices (100*a*-100*f*).

Wireless communication/connection (150*a*, 150*b*, and 150*c*) may be performed between the wireless devices (100*a*-100*f*)/base station (200) and the base station (200)/base station (200). Here, the wireless communication/connection includes uplink/downlink communication (150*a*) and sidelink communication (150*b*) (or D2D communication), and communication between base stations (150*c*) (e.g. relay, IAB (Integrated Access Backhaul)). This can be done through technology (e.g. 5G NR) Wireless communication/connection (150*a*, 150*b*, 150*c*) allows the wireless device and the base station/radio device, and the base station and the base station to transmit/receive wireless signals to each other. For example, the wireless communication/connection (150a, 150b, and 150c) may transmit/receive a signal through various physical channels. To this end, based on various proposals of the present specification, At least some of various configuration information setting process for transmission/reception of a wireless signal (e.g., channel encoding/decoding, modulation/demodulation, resource mapping/demapping, etc.), resource allocation process and etc. may be performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. have. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method of operating for V2X (VEHICLE-TO-EVERYTHING) device equipped on a vehicle, comprising:
    receiving capability Enquiry message from base station;
    transmitting capability information to the base station;
    wherein the capability information includes information on whether the V2X device supports both radio link with the base station and sidelink with neighbor V2X device by the same antenna,
    receiving, from the base station, information on default beam which is configured based on the capability information.

2. The method of claim 1,
    wherein the information on default beam includes information configuring a beam for sidelink as default beam.

3. The method of claim 1,
    Wherein the information on default beam includes information for a beam for sidelink.

4. The method of claim 1,
    wherein the default beam is determined by a level that satisfies a spherical coverage EIRP (effective isotropic radiated power) for a radio link with the base station.

5. The method of claim 1,
    wherein the default beam is set to a beam of 90 degrees or −90 degrees with respect to the vertical axis to the front or rear Way, based on that the spherical coverage for the radio link with the base station includes 90 degrees or −90 degrees with respect to the vertical axis of the vehicle.

6. The method of claim 1,
    wherein the sidelink is operated in FR2 band.

7. The method of claim 6,
    wherein beamforming is used for the sidelink, but beam management for the sidelink is not used.

8. A V2X (VEHICLE-TO-EVERYTHING) device equipped on a vehicle comprising:
    at least one processor; and
    at least one memory for storing instructions and operably electrically connectable with the at least one processor, based on the instructions being operated by the at least one processor, performed operation comprising:
    receiving capability Enquiry message from base station;
    transmitting capability information to the base station;
    wherein the capability information includes information on whether the V2X device supports both radio link with the base station and sidelink with neighbor V2X device by the same antenna,
    receiving, from the base station, information on default beam which is configured based on the capability information.

9. The device of claim 8,
    wherein the information on default beam includes information configuring a beam for sidelink as default beam.

10. The device of claim 8,
    Wherein the information on default beam includes information for a beam for sidelink.

11. The device of claim 8,
    wherein the default beam is determined by a level that satisfies a spherical coverage EIRP (effective isotropic radiated power) for a radio link with the base station.

12. The device of claim 8,
    wherein the default beam is set to a beam of 90 degrees or −90 degrees with respect to the vertical axis to the front or rear Way, based on that the spherical coverage for the radio link with the base station includes 90 degrees or −90 degrees with respect to the vertical axis of the vehicle.

* * * * *